United States Patent [19]

Bauer et al.

[11] 4,134,065

[45] Jan. 9, 1979

[54] TRANSDUCER FOR DIRECTLY CONVERTING MECHANICAL DISPLACEMENT TO PHASE INFORMATION

[75] Inventors: Dan O. Bauer, Portage; Michael A. Pauwels, Kalamazoo, both of Mich.

[73] Assignee: Pneumo Corporation, Boston, Mass.

[21] Appl. No.: 758,654

[22] Filed: Jan. 12, 1977

[51] Int. Cl.² .................... G01R 33/12; G01B 7/00
[52] U.S. Cl. ............................ 324/208; 318/653; 323/113; 336/45; 336/136; 340/196
[58] Field of Search ............. 324/34 D, 34 PS, 83 D; 340/195, 196, 199; 323/51, 90, 113; 336/45, 130, 136; 318/652, 653, 659, 660, 661

[56] References Cited

U.S. PATENT DOCUMENTS

| | | | |
|---|---|---|---|
| 2,769,969 | 11/1956 | Comstock | 340/196 |
| 3,138,772 | 6/1964 | Persons, Jr. | 336/136 |
| 3,281,655 | 10/1966 | Blasingame | 340/196 |
| 3,546,570 | 12/1970 | Bullock | 318/661 |
| 3,555,542 | 1/1971 | Guiot | 318/661 |
| 3,671,876 | 6/1972 | Oshiro | 324/83 D |

FOREIGN PATENT DOCUMENTS

| | | | |
|---|---|---|---|
| 963715 | 7/1964 | United Kingdom | 336/136 |
| 1189981 | 4/1970 | United Kingdom | 324/34 D |

*Primary Examiner*—Robert J. Corcoran
*Attorney, Agent, or Firm*—Maky, Renner, Otto & Boisselle

[57] ABSTRACT

A linear variable phase transformer directly converts displacement to phase information. In one form the relationship of such displacement and such phase information is substantially linear or directly proportional. Moreover, a circuit is provided for directly converting such phase information to digital information which is preferably provided in a binary format.

37 Claims, 12 Drawing Figures

FIG. 3A

TRANSDUCER FOR DIRECTLY CONVERTING MECHANICAL DISPLACEMENT TO PHASE INFORMATION

BACKGROUND OF THE INVENTION

The present invention relates generally to displacement detecting transducers. More particularly, the invention relates to a displacement to phase transducer and to a system for providing phase modulated information related to displacement or position detected by such transducer. In the preferred form, the invention is directed to a linear variable phase transformer and to a system that provides directly an output in digital format indicative of relative displacement detected by such transformer.

RELATED PRIOR ART

Various types of transducer devices exist. One type produces an output electrical signal that varies in amplitude with respect to position, such as a linear variable differential transformer (LVDT). Although some LVDT's are described as having phase related input and output signals, the term phase in such cases is used in the sense of polarity of an alternating current wave form; thus, zero phase means an in-phase signal and 180° phase or out-of-phase means a relatively opposite polarity signal. Other transducer devices include moving coils wound on magnetically permeable material, such as resolver and syncro devices or printed coils on magnetically permeable material such as Inductosyn type devices. These devices include moving contacts or wires.

U.S. Pat. No. 2,988,697 discloses a selsyn device for indicating the position of a movable member. The voltages induced in three detector windings by a movable magnetically permeable core in which a flux is developed by an input coil energized from a single phase AC source are applied to three corresponding stator windings of a selsyn receiver causing the rotor coil thereof to assume a position indicative of the position of the core. In another embodiment the three windings are energized by a three phase AC source to set up a rotating field which is coupled to a single coil by the movable core, and a phase meter detects the phase of the voltage thus induced in the coil as an indication of the relative position of the core. In the '697 patent the windings are so placed relative to the core that the flux induced in the latter is in a radial direction. In one embodiment the flux vector in the movable core rotates in orientation as the core is displaced and in the other embodiment the radial flux vector is stationary and the secondary, being spirally wound, senses the relative direction of the flux vector. The coupling between the various primaries and the movable core is constant and radial, and the relative geometric orientation of the flux vectors and the axis of the secondary coil at the position of the core determines the phase of the output signal. It is the rotation of this relative geometric orientation as the core is moved through the hollow tubular cylinder of the device that provides the output information.

In U.S. Pat. No. 2,911,632 a position transducer employs a plurality of primary coils of different respective widths and a magnetically permeable member that moves along the primaries to couple flux from any one of them into a small area of a search coil secondary. The amplitude of the voltage induced in the secondary indicates the position of the movable member.

SUMMARY OF THE INVENTION

In the displacement to phase transducer of the present invention position information is converted to a phase quantity or a time based relationship and that quantity may be readily demodulated to provide a system output in a digital format, e.g. as a digital or binary number. The flux vector (hereinafter flux) in a magnetically permeable ferromagnetic core position sensor of a linear variable phase transformer (hereinafter LVPT) induced by respective AC excitation signals in primary windings (hereinafter primaries) within which the core is movable in turn induces an output signal in a secondary or search winding or coil (hereinafter secondary). The phase of the output signal is directly related to the phase of the flux in the core, and it is the relative mix of primary excitations in the core that determines or, rather, indicates the core position thereby to phase modulate the output signal. Hereinafter the word position may be used interchangeably to note both the relative position of the core and the primary windings of the LVPT or to denote the displacement of the core from a null location in the LVPT.

The primaries preferably are circumferentially wound, which causes the core flux to be axial, i.e. parallel to core displacement direction, vectorially additive, and varying in phase. This circumferential arrangement of primaries permits the device to have a relatively small diameter while still being able to maintain a relatively large flux density in the core to maintain a strong output signal having essentially infinite resolution with minimum input power requirements. The compactness of the device and/or the ability to provide strong and, if desired, fluid tight physical separation between the movable core and the windings, for example, by the bobbin and/or the cover facilitate construction of the same to tolerate relatively large pressure differences between the respective areas in which the movable core and the windings portion of the device, are located. Such isolation of the windings from the core also may preclude damage, say, by hostile environments, and the relatively small size of the device facilitates use thereof in relatively small spaces. Moreover, since the primaries and secondary are circumferentially wound multiturn coils and since the secondary is preferably located so that a relatively constant large number of turns are engaged with the core at any operative position thereof, the strong well resolved output signal is produced for substantially any position of the core while utilizing relatively low excitation current levels, usually much less than one ampere, and frequencies, on the order of, for example, from about 60 to about several thousand Hz. and preferably from a few hundred to a few thousand Hz.

In the present invention the phase of an output signal produced by the LVPT indicates the positional relationship of the core with respect to the primaries and secondary. Preferably the several windings are stationary and the core is movable therein in a generally linear direction by an external device, the position of which is to be detected, to modulate the phase of the output signal relative to the phase of a reference signal. As used herein the term phase means the actual phase of an AC electrical signal or the relationship thereof to the phase of a reference AC electrical signal as opposed to simply the polarity relationship therebetween. Thus, the output signal is a time based signal, the phase of which when related to the phase of the reference signal provides a quantitative measure of the core position in the LVPT. Moreover, any phase quantity, meaning the phase difference between the phase modulated output signal or the square wave logic signal wave form in phase therewith, for example, and the reference, would also be distinguished with a polarity of its own, such as, for example, positive or negative indicating that the output signal is leading or lagging, respectively, the reference signal.

In the LVPT the primaries and secondary may be wound about a hollow bobbin or the like. The magnetically permeable core is movable within the bobbin along the generally linear axis thereof, such movement being effected, for example, by a mechanical coupling to an external device, the position of which is to be detected. The primaries are excited by respective AC excitation signals that produce respective fluxes in the core which are out of phase with each other by other than 0° or 180°. Preferably, the AC excitation signals are of the same frequency, but are also out of phase with respect to each other by other than 0° or 180°. The fluxes produced by those excited primaries are summed or combined in the core. The combined flux vector or output flux induces an AC output signal as a voltage in the secondary, the frequency of which is the same as that of the excitation signals and the phase of which is determined by the output flux in the core. In the case of linear wound primary coils, as will be discussed further below, the phase of the output flux in the core and, thus, the phase of the output signal induced in the secondary will be an arc tangent function of position of the core in the LVPT.

Moreover, in one embodiment of the invention an equation of the arc tangent function was solved and the transformer primaries were wound according to the solution to provide a generally linear change in the phase of the output signal with respect to position of the core.

The phase modulated output signal, or simply output signal hereinafter, from the LVPT is provided to a demodulator electronic circuit that directly converts the phase information to a system output signal that preferably is in digital form. That digital form may be a parallel type true binary number, a binary coded decimal representation of the same, or the like; or that digital form may be a serial type binary representation, such as, for example, a series of pulses or counts produced during a particular time period, etc. Alternatively, the indicated digital form of the system output signal may be a true decade digital representation of the phase information and, thus, of the detected displacement. Therefore, as used herein, reference to digital form or format of the system output signal may be understood as the foregoing or other generally related or equivalent digital forms as will be appreciated by those persons having ordinary skill in the art.

The demodulator circuit is essentially a zero crossing detector which detects the relative zero crossing points of a reference signal and the output signal and provides the system output signal indicating whether the phase of the output signal leads or lags the reference signal and the magnitude of the phase difference, thereby to provide system output information indicative of the position of the core, for example, with respect to a known null position. The system output information may be directed to a display or to other circuitry for various purposes. The LVPT is particularly useful where position information must be determined during conditions of noise or other interference inasmuch as the output signal is provided as a phase relationship rather than as an amplitude relationship as in a conventional LVDT. Several other advantages of the LVPT and the demodulator circuit associated therewith are the low power requirements thereof, the relatively light weight, the convenient ability to seal the windings from the core to facilitate use in hostile environments, and the wide range of temperatures over which the LVPT and circuit may be used consistent with the materials used and the magnetic properties of the core without any adverse effect on its operation. Also, the LVPT of the invention with its directly developed digital format output has the additional advantage of being capable of direct interfacing with a digital system without the need for further analog-to-digital conversion circuitry.

OBJECTS AND ADVANTAGES

With the foregoing in mind a principal object of the invention is to provide a transducer that is improved in the noted respects.

Another principal object is to linearize the relationship between the phase of an output signal and the relative position of a movable member in an LVPT.

Another object is to phase modulate an electrical signal relative to position of a movable member.

An additional object is to provide directly output information generally in a digital format, i.e. as a digital or a binary number, for example, in either parallel or serial format, indicative of position of a movable member.

A further object is to develop a phase modulated output signal that is indicative of position of a relatively movable member and which can conveniently be employed to provide velocity and/or acceleration information as well.

Still another object is to obtain good resolution of electric signal information indicative of the position of a movable member and, moreover, to assure a satisfactory output signal at each position of the relatively movable member.

Still an additional object is conveniently to develop accurate position information concerning a relatively movable member and/or an external device coupled thereto, especially wherein such external device and/or the movable member are located in hostile environments, environments in which relatively large amounts of spurious electrical noise or absolute excitation level variations may occur, environments in which large pressure variations occur, etc.

Still a further object is to demodulate a phase modulated signal to provide output information conveniently in parallel or serial digital format, for example, as an electrical or displayed digital binary number.

Even another object is to provide a device that can detect the motion of a moveable member operating within a fluid medium.

Even an additional object is to provide a device that can detect the motion of a moveable member without electrical connection thereto.

Even a further object is to provide a device that can detect motion of a moveable member that is physically isolated from the electrical portions by the way of a barrier that can withstand large pressures.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings

FIG. 3A is a general schematic electric circuit diagram in block form and FIG. 3B is a specific schematic electric circuit diagram example depicting driving and demodulator circuits in accordance with the invention associated with the LVPT for energizing the latter and for providing output information indicative of the positional relationship of the movable core and the coils thereof;

FIGS. 5A through 5G are graphical representations of signals and counts that occur in the LVPT and electric circuit of the invention during operation thereof.

DESCRIPTION OF THE PREFERRED EMBODIMENT

Figure 1:
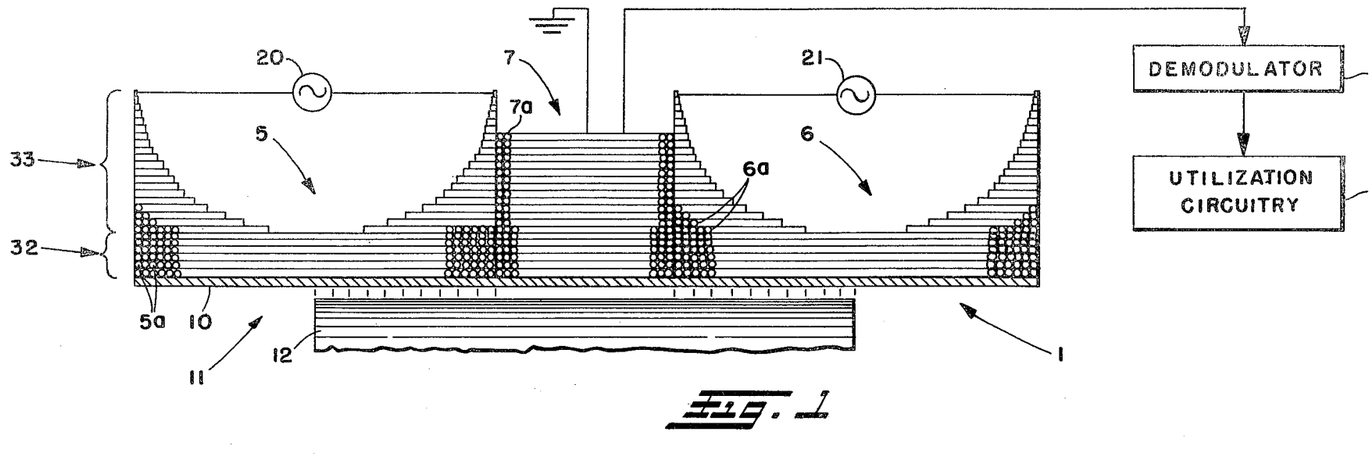
FIG. 1 is a partial section view schematically illustrating one form of LVPT in accordance with the invention.
Figure 3A:
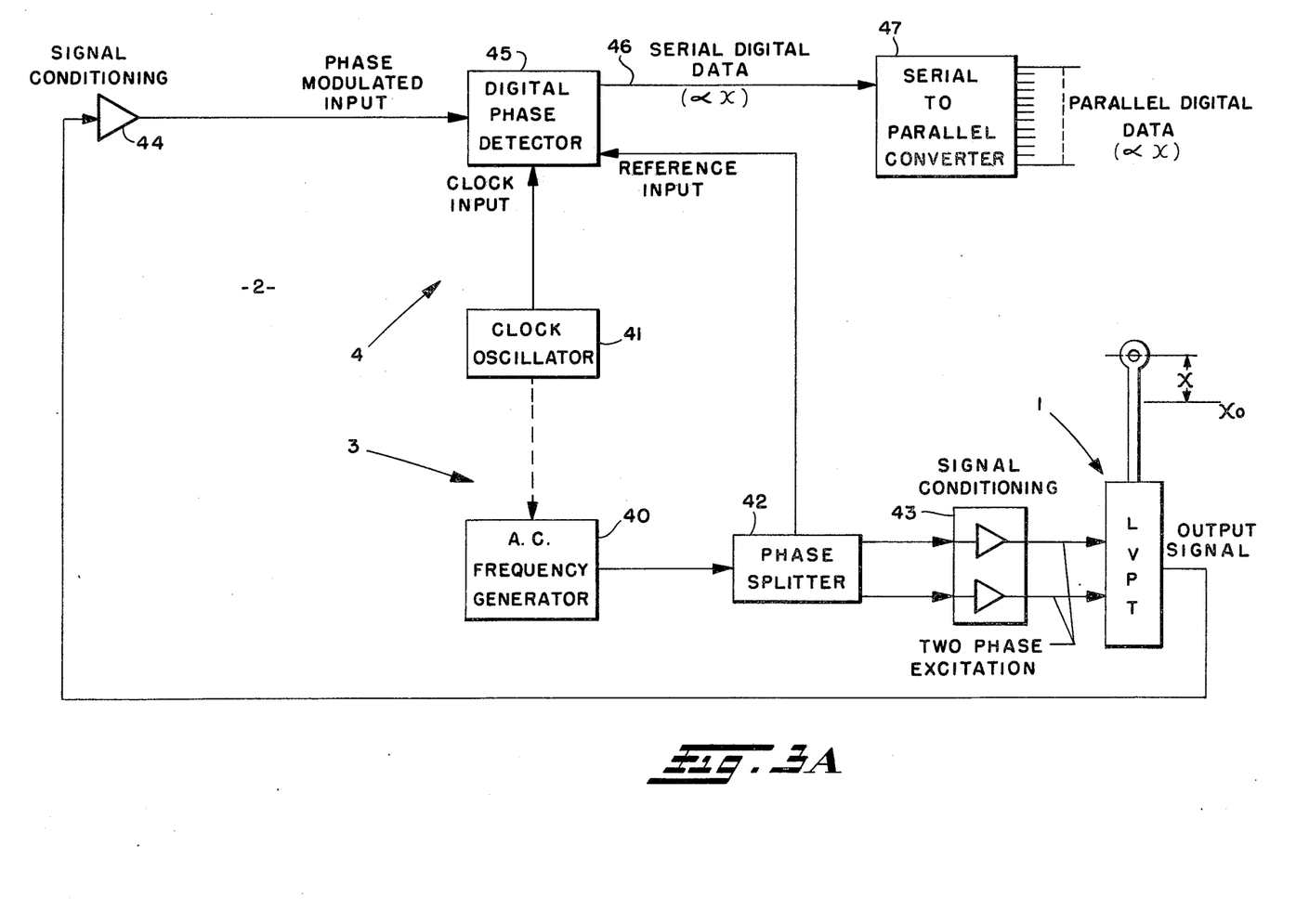

Referring now more particularly to the drawings, wherein like reference numerals designate like parts in the several figures, and initially to FIG. 1, there is illustrated a linear variable phase transformer (LVPT) 1. Actually, only one cross-sectional half of the LVPT 1 is shown, but it will be understood that the lower half relative to the drawing is substantially the mirror image of the upper half shown. In FIGS. 3A and 3B there is shown an electric circuit 2, which includes a drive circuit portion 3 for energizing or exciting the LVPT and a demodulator or output circuit portion 4 that directly converts the phase modulated output signal from the LVPT to a system output signal. This system output signal preferably is in a parallel or serial binary format although it may be provided in other digital formats, in analog format, or in other formats. In the present case the binary format of the system output signal facilitates interfacing with a computer system for output display or for control purposes.

The LVPT 1 includes a pair of primaries 5, 6 and a secondary 7, collectively referred to as coils below, all of which are circumferentially wound in a manner to be described further below about a conventional hollow bobbin 10, which may be formed, for example, of electrically insulated and non-magnetic material. Some of the circumferential turns 5a, 6a, 7a of the respective coils are illustrated and the secondary 7 is positioned between the two primaries 5, 6 axially along the bobbin 10. If desired, the coils 5, 6 and 7 may be sealed, encapsulated, or otherwise isolated from the external environment in which the LVPT 1 is located to protect same from hostile environments. Within the hollow volume 11 circumscribed by the coils and, if used, the bobbin 10, is a movable core 12. The core is formed of ferromagnetic material that is relatively highly magnetically permeable, and the core is mechanically coupled, as shown in FIG. 3, by a connector 13 to an external member or device 14, the position of which is to be detected by the LVPT system 15, which includes the LVPT 1 and the electric circuit 2. Such external device is preferably movable relative to a body or support 16, and a cover 17 about the coils 5, 6 and 7 is fastened in any convenient manner at a flange 18 to the body 16 to support the LVPT 1 thereby. The cover 17 and bobbin 10 may be cooperable to provide strong physical isolation of the coils from the core.

During use of the LVPT 1 to detect the position of the external device 14, each of the first and second primaries 5, 6 is excited by respective excitation signals to provide respective fluxes in the core 12 with such fluxes being out of phase by other than 0° or 180°. Preferably the excitation signals are supplied from controlled constant current sources 20, 21 so that the excitation signals have substantially identical AC wave forms with the fundamental frequency of such wave forms also being out of phase with respect to each other by an amount other than 0° or 180°. The wave form could be sinusoidal, rectangular, triangular or any other periodic waveform which contains the desired fundamental excitation. In the preferred embodiment the excitation signals are separated or out of phase by 120°. The magnitude of each such induced flux vector depends on the number of turns of the respective primary coil cut by the core 12 or, in other words, with which the core 12 is aligned or magnetically engaged, as is well known, and preferably the phase of each such flux corresponds to the phase of the respective AC excitation signal causing the same. The two independently induced magnetic flux vectors, which extend in an axial direction, are combined in the core 12 resulting in a combined flux vector sum or output flux therein. As long as the core 12 is aligned with at least part of each of the primaries the phase and amplitude of the output flux will be different from each of the respective phases and amplitudes of the respective independently induced magnetic flux vectors.

The output flux in the core 12 induces an AC output signal in the secondary 7 with the phase of such output signal being directly related to the phase of the output flux. Therefore, as relative movement occurs in the LVPT 1 between the core 12 and the respective coils 5, 6 and 7, the fundamental frequency of the output signal is phase modulated and, thus, is provided as a time-based signal indicative of the core position. Preferably the coils are fixed relative to the body 16 and the core is the relatively movable part of the LVPT; however, it will be appreciated that alternatively the core may be fixed and the coils moved.

In the demodulator circuit 4 the actual phase of the phase modulated output signal is compared to that of a reference AC signal. The phase quantity or phase difference and whether the output signal leads or lags the reference signal are indicative of the position of the core 12 relative to the coils 5, 6 and 7. In the preferred embodiment the demodulator circuit 4 directly converts that phase difference to a parallel or serial digital signal as the system output signal of the LVPT system 15.

As mentioned above, the output flux induced in the core 12 is equal to the vector sum of the flux induced by the primary 5 and the flux induced by the primary 6. Moreover, each of those independent fluxes is directly proportional to the current through the respective primary and the number of turns of that primary which are cut by the core 12. Assuming that each of the primaries 5, 6 is energized by respective AC excitation signals of equal maximum amplitudes I and of a phase separation $\theta$, the currents $I_1$ and $I_2$ which flow through the respective primaries as a function of time may be written, as is well known, as follows:

$$I_1 = I \sin(wt + \theta/2) \quad (1)$$

$$I_2 = I \sin(wt - \theta/2) \quad (2)$$

Since the flux in the core 12 is equal to the sum of the flux vectors independently induced by each of the primaries and since each of those independent fluxes is directly proportional to the number of turns $N_1$ and $N_2$ of each of the primaries 5, 6, respectively, engaged with the core and the respective currents $I_1$ and $I_2$ through the primaries, the phase angle $\phi_c$ of the flux in the core can be shown to be:

$$\phi_c = \text{Arc Tan} \frac{N_1 - N_2}{N_1 + N_2} \text{Tan } \theta/2 \quad 3)$$

The magnitude of the flux in the core also can be conveniently determined in conventional manner; however, the equation for such magnitude is not presented inasmuch as the actual magnitude of the flux in the core is immaterial so long as it is sufficiently large to induce the output signal in the secondary 7 at a sufficiently large magnitude such that the demodulator circuit 4 or other output circuit associated with the LVPT 1 is capable of detecting such output signal and determining the phase thereof.

In view of the foregoing it will be clear that in the case of linear wound primaries 5, 6, wherein the number of turns engaged with the core 12 is directly proportional to the position of the core in the LVPT 1, the theoretical phase of the output signal, as detected by the secondary 7, will be an arc tangent function of the core position. Although the arc tangent function is a non-linear one, i.e. the phase angle of the flux in the core will not vary linearly with displacement of the core, suitable calibration, detecting, or demodulating techniques may be employed to provide a system output signal having satisfactory information that is indicative of the core position as a function of the phase of the output signal from the secondary 7.

To facilitate such calibration, as is the case in the preferred form of the invention, the core 12 may be constrained in the LVPT 1 such that the same number of turns of the secondary 7 are always cut by the core. In the embodiment of the LVPT 1 in FIG. 1 this constant number of turns is all of the turns of the secondary; whereas in the LVPT 1' in FIG. 2, wherein elements corresponding to those of FIG. 1 are designated with the same, but primed, reference numerals, the secondary 7' is uniformly wound over the entire axial length of the bobbin 10' shared by the primaries 5', 6', and the constant number of secondary turns cut by the core is less than all those turns. Thus, in FIG. 1 as the core 12 moves in the LVPT 1 neither end will move into the area radially cut by the secondary 7 and preferably neither core end will move beyond the axial ends of the primaries 5, 6 at opposite ends of the bobbin 10; similarly, the ends of the core 12' in the LVPT 1' will not move outside the axial ends of the primaries 5', 6' at opposite ends of the bobbin 10'. Operation of the LVPT 1' is substantially the same as operation of the LVPT 1.

By altering the winding pattern of the primary coils 5, 6 such that the number of turns engaged with the core 12 varies nonlinearly with position on either side of a null position, the variation of the phase of the output flux in the core with respect to the position of the core and, thus, equation 3 above can be made more nearly linear. Such linearization of the LVPT 1 will reduce the calibrating requirements of the demodulator circuit 4.

The manner in which the arc tangent function of equation 3 is linearized such that, for example, the phase of the output signal will undergo equal changes for equal increments of displacement of the core 12", say from a null position thereof as illustrated in solid lines in the schematically illustrated LVPT 1" model of FIG. 4, will now be described. Elements of the LVPT 1" corresponding to elements of the LVPT 1 are identified by the same, but double primed, reference numerals. For the purposes of this description and to simplify the development of the winding pattern of the primaries 5", 6" of the LVPT 1" to obtain the desired linearization, several assumptions will be made. Specifically, it is assumed that both primaries are identical, that each primary has an axial length of two inches, that each primary is symmetrical along and about the LVPT axis, that in a null position the core extends between a center location of the first primary 5" to a center location of the second primary 6", and that the total stroke length is, for example, two inches, i.e. the core may move on inch in either direction from the null position. It is also assumed that both primaries are excited by identical excitation signals that have a phase separation of 120° and that at the null position of the core the phase of the output signal induced in the secondary 7" is zero degrees, i.e. there is a zero degrees phase difference between the output signal and the phase of a reference signal. Moreover, it is assumed that the secondary 7" is located between the two primaries 5" and 6" so that the number of turns of the secondary engaged with the core remains constant; however, it will be appreciated that the discussion below similarly pertains to an arrangement of coils such that the secondary may be located beneath the two primaries as in the LVPT 1' provided the secondary is relatively accurately wound so that the number of turns thereof engaged with the core remains substantially constant regardless of the core position.

Further, assuming that the phase of the output signal at a one inch stroke of the core away from the null position in either direction is 60°, either leading or lagging the reference signal, the full one inch displacement may be divided, the example, into one-tenth inch increments whereby the phase of the output signal will change by 6° per one-tenth inch increment of displacement. Thus it may be assumed that each axial half of each primary is made up of incremental radial segments A through J, each segment being one-tenth inch wide and corresponding to respective one-tenth inch displacement increments. As each one-tenth inch segment is traversed by the core 12", the number of turns of that primary coupled to the secondary via the core is increased or reduced by the number of turns of the primary in that segment. Although only the half of the first primary 5" most proximate the secondary 7" is so labeled, it will be appreciated that the other mirror image half of the first primary is identical with the labeled half such that the coil halves are symmetrical and that the second primary 6" is identical.

Let N represent the sum of the turns $N_A$, $N_B$, etc., of each radial segment of the labeled segmented half of the first primary 5". Therefore, the number N represents the number of turns of each of the first and second primaries 5", 6" that are engaged with the core 12" when the core is in its null position. As assumed above, in the null position the phase of the output signal will be zero degrees and, therefore, for the null position of the core equation 3 can be rewritten, as follows:

$$0° = \text{Arc Tan} \frac{N-N}{N+N} \text{Tan} \frac{120°}{2} \quad (4)$$

$$= \text{Arc Tan} \frac{O}{2N} \text{Tan } 60°$$

Figure 4:
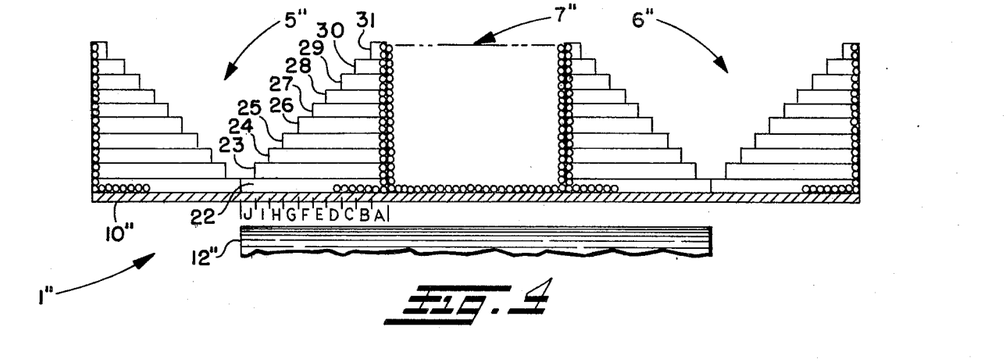
FIG. 4 is a schematic representation of one half of a model LVPT.

When the core is displaced, for example, by one-tenth inch increment to the right, relative to the illustration of FIG. 4, the number of turns $N_1$ of the first primary 5" engaged with the core 12 is descreased by the number of turns $N_J$ in the J'th radial segment and the number of turns $N_2$ of the second primary 6" engaged with the core is increased by the number of turns $N_J$ in the J'th radial segment of the second primary. For this condition of one-tenth inch displacement of the core 12" equation 3 may be rewritten as follows:

$$6° = \text{Arc Tan} \frac{(N-N_J)-(N+N_J)}{N-N_J+N+N_J} \text{Tan} \frac{120°}{2} \quad (5)$$

$$= \text{Arc Tan} -\frac{N_J}{N} \text{Tan } 60°$$

Similar equations may be derived for the respective conditions of the core 12" as it is axially displaced to the right by one-tenth inch increments in the LVPT 1" generally becoming out of engagement with turns of the first primary 5" and into engagement with additional turns of the second primary 6". Ultimately, then, nine equations in ten unknowns may be derived in this manner. A tenth equation in all ten of the unknowns is, as follows:

$$N_A + N_B + \ldots N_I + N_J = N \quad (6)$$

However, the total number of turns N in each half of each primary coil 5", 6" may be selected empirically, for example, as long as the number of turns at the current levels employed ultimately produce a detectable output signal in the secondary 7". In the preferred embodiment the value of N was selected at 1,220, i.e. N = 1,200. Thus, with the same number of unknowns as equations in those unknowns, the values of the unknowns may be solved in conventional manner. Chart I below shows the obtained values for the number of turns in each segment of each half of each of the primaries 5", 6".

CHART I

| | |
|---|---|
| $N_J$ = 74 | $N_E$ = 105 |
| $N_I$ = 76 | $N_D$ = 122 |
| $N_H$ = 79 | $N_C$ = 148 |
| $N_G$ = 85 | $N_B$ = 187 |
| $N_F$ = 93 | $N_A$ = 251 |

Accordingly, when the core 12" is in its null position, 1,220 turns of each of the primaries 5", 6" will be engaged therewith or, in other words, cut thereby such that the current flowing through those respective turns will induce a magnetic flux in the core. Similarly, when the core is displaced eight-tenths inch to the right, for example relative to the illustration of FIG. 4, there will only be 438 turns of the first primary engaged therewith, i.e. the sum of $N_A$ and $N_B$, but there will be 2,002 turns of the second primary engaged with the core, i.e. (2N-438).

To obtain the above-described segmented arrangement of the primaries 5", 6", a stepped winding pattern as is generally depicted in FIG. 4 is developed. In this pattern one or more layers of juxtaposed circumferential turns are wound in a first circumferential bar-like area or step 22, as depicted in FIG. 4, about the hollow bobbin 10", this area extending from a location adjacent the secondary 7" to the center of the primary 5". A second bar-like area 23 adjacent the first but radially displaced from the bobbin 10" also has one or more layers of juxtaposed circumferential turns wound therein starting at the I'the radial segment, as shown. In this manner all of the stepped areas 22 through 31 are wound so that each axial half of each primary will have a stepped profile, and the overall primary will have a generally U-shaped cross-sectional profile, as is illustrated. The number and spacing of the turns in each stepped area are selected such that ultimately the number of turns in each radial segment is in accordance with Chart I above. The manner in which each turn in a given primary follows another turn or, in other words, how the turns are wound is not critical as long as such winding provides one direction current flow through the turns of the primary circumferentially about the axis of the transformer.

It will now be clear that as the core 12" in the LVPT 1" of FIG. 4 is moved in one-tenth inch increments, the phase of the output signal will vary by 6° increments. Moreover, at various positions of the core in the LVPT other than at the specific end boundaries of the incremental locations, the phase of the output signal also will vary correspondingly. However, such variation will not be directly linear for the ten-stepped configuration of bar-like areas of the primaries 5", 6" illustrated in FIG. 4.

To obtain a more linearly accurate phase variation with respect to core displacement, the above-described techniques may be repeated for smaller displacement increments or, alternatively, a conventional curve-fitting technique may be applied to provide a graphical solution for equation 3 above using the data of Chart I above. Such curve-fitting technique was employed to obtain the preferred embodiment of the LVPT 1 illustrated in FIG. 1. Therefore, the primary 5 includes six continuous bar-like layers generally designated 32, with the combination of these layers being analogous to the area 22 and its mirror image in the LVPT 1" of FIG. 4, and with each layer preferably including 250 turns arranged in the aligned pattern illustrated. The right-hand half of the primary 5 also includes twenty discontinuous bar-like areas generally designated 33, each of which includes a number of turns arranged in the illustrated pattern, respectively, as follows: 93, 75, 63, 52, 43, 35, 32, 33, 23, 18, 13, 11, 10, 9, 8, 7, 6, 5, 4, and 3.

The left-hand half of the primary 5 includes an identical arrangement of discontinuous bar-like areas, and the primary 6 is also identically wound. Further, the secondary 7 of the LVPT 1 preferably includes approximately the same number of turns as is contained in either one of the two primary coils. Therefore, the amplitude of the output signal will be approximately on the same order of magnitude as either one of the two excitation signals. It has been found that an LVPT constructed in the manner illustrated in FIG. 1 and described hereinabove provides a high degree of linearity in the correspondence of phase angle of the output signal with respect to position of the core 12.

The foregoing description relates to a preferred form of LVPT in accordance with the invention which provides a relatively high degree of linearity and resolution, and to obtain the same the foregoing relationships were assumed. However, it will be appreciated that one or more of those assumptions may be negatived with the result that the phase of the output signal may not correspond linearly with position of the core 12; nevertheless, the output signal may be otherwise demodulated and/or calibrated to provide useful output information indicative of core position either directly as a non-linear variation or indirectly as a modified linearly varying signal.

In referring now more particularly to FIG. 3A, it will be appreciated that the preferred electric circuit 2 schematically illustrated therein is but one form of drive circuit 3 for exciting the two primaries 5, 6 of the LVPT 1 and demodulator circuit 4 for analyzing the phase of the output signal preferably as a comparison with respect to the phase of a reference signal and that other types of electric circuits may be equivalently employed with the LVPT 1 for energizing the same and for analyzing the output thereof.

Fundamentally, the drive circuit portion 3 of the circuit 2 as illustrated in FIG. 3A includes an AC signal or frequency generator 40, which generates an AC input signal having a fundamental frequency and which may be driven or synchronized with a conventional clock oscillator 41 that produces a continuous train of clock pulses, for example; a phase splitter 42, which splits that input signal into a reference and two excitation signals having the same fundamental frequency but different respective phases; and a signal conditioning circuit 43, such as filters and/or amplifiers to shape and/or to amplify the respective excitation signals to desired form for exciting the respective primaries of the LVPT 1. The output circuit portion 4 includes a signal conditioning circuit 44, which shapes and/or amplifies the phase modulated output signal from the secondary of the LVPT 1 to a convenient form, such as a square wave; and a digital phase detector 45, which, as is described in more detail below, compares the conditioned phase modulated signal input with the reference signal input and produces a digital output representative of that comparison and, thus, of the core displacement in the LVPT 1. Preferably, the digital phase detector 45 receives the train of clock pulses from the clock oscillator 41 and periodically passes respective bursts of those pulses to line 46 with the number of pulses in each burst being representative of the phase difference between the conditioned phase modulated output signal and the reference signal. Accordingly, those bursts of pulses are in the form of serial digital data proportionally representative of the LVPT core displacement. Moreover, the output circuit portion 4 also may include a serial to parallel converter 47 that converts the serial digital data to parallel digital data, such as discrete binary numbers, binary coded decimal numbers, etc. proportionally representative of the LVPT core displacement.

The electric circuit 2, as illustrated in more detail in FIG. 3B, includes a clock oscillator 41, which may be, for example, a crystal oscillator Model No. CO-236 manufactured by Vectron Laboratories, Inc., Norwalk, Connecticut, that produces a 1.2 megahertz square wave clock signal at the clock output 51. The oscillator 41 and the other portions of the electric circuit 2 ordinarily would receive appropriate $V_{cc}$ power or the like from a conventional power supply coupled to appropriate terminals, not shown. The drive circuit 3 includes a conventional divide by five hundred frequency divider component 52 of the AC frequency generator 40 which reduces the clock signal to a 2.4 kilohertz signal that is delivered via the line 53 to the clock input of the first stage 54a of a three stage JK flip-flop circuit arrangement 55 forming the phase splitter 42. Each of the stages 54a, 54b, 54c of the JK flip-flop 55 is coupled such that in response to the 2.4 kilohertz input signal on the line 53, the JK flip-flop digitally splits such input signal to produce a 400 hertz square wave reference electrical signal on reference line 56 and the first and second 400 hertz square wave excitation signals on the excitation lines 57, 58. Moreover, the JK flip-flop 55 produces the excitation signals such that they differ in phase by 120° and such that the first excitation signal leads the reference electrical signal by 60° and the second excitation signal lags the reference electrical signal by 60°.

The drive circuit 3 also may include as the signal conditioning circuit 43 a pair of conventional filters 60, 61, which convert the respective square wave excitation signals to respective sine waves represented at 62, 63 still maintaining the relative phase relationships, and a pair of conventional amplifiers 64, 65 which deliver the respective excitation signals via the drive lines 66, 67 to the respective primary coils 5, 6 of the LVPT 1. Each of the amplifiers 64, 65 preferably is of the constant current type so that the amplitude and, of course, the phase of each excitation signal delivered thereby remains substantially constant regardless of the changing effective impedance of the primaries 5, 6.

The phase modulated output signal produced by the secondary 7 of the LVPT 1 is delivered via the output lines 70, 71 to the demodulator circuit 4. If the excitation is other than sinusoidal, a conventional filter may be required in line 70. The demodulator circuit is in effect a phase detector circuit 45 that detects the phase of the phase modulated output signal preferably by comparing the phase thereof to that of the reference electrical signal on the reference line 56. Accordingly, the demodulator portion has at its input a signal conditioning squaring circuit 72 that includes an input resistor 73, a pair of back-to-back diodes 74, 75 and a relatively high input impedance amplifier 76 that converts the phase modulated sinusoidal output signal from the secondary 7 to a phase modulated square wave signal on the line 77 for delivery to the logic circuitry 80, which operates in part as a zero crossing or relative phase detector.

The demodulator circuit also includes a conventional electronic counter 81, acting to convert serial digital data to parallel digital data, which in the preferred embodiment is in the form of a twelve bit binary up-/down counter including a plurality of preload input circuits 82 to insert off-set information in the counter. Each input circuit 82 comprises a switch 83 that may be selectively closed to complete a circuit to a relative ground connection 84 or other source of known potential. Each of the switch circuits in the preload input circuits 82 represents a respective bit of, for example, a ten bit binary number. By closing the switch 83 in one of the switch circuits that particular bit becomes a logic zero signal level due to the ground connection 84, and by opening such switch such bit becomes a logic 1 signal, for example, a relatively positive voltage level.

As used herein, a logic 0 signal indicates a connection to a source of relative ground potential and a logic 1 signal indicates a connection to a relative positive potential. If desired, however, other logic conventions may be used as will be clear to those skilled in the art.

Depending on the particular adjustment of the preload input circuits 82, a predetermined binary off-set number may be preloaded into the counter 81 whenever the leading edge of a positive load signal appears on the loading line 85 to the load input 86 of the counter causing the latter immediately to assume a count level indicative of such number. A twelve bit binary system output signal representative of a binary number output is therefore produced at the output 87 of the counter 81 on output lines 88 indicative of such off-set number. The counter 81 may comprise, for example, three cascaded 4-bit binary counter microcircuits, such as those manufactured by RCA under Part No. CD 4029 AE or similar devices which are preferably connected in a parallel clocking arrangement.

The counter 81 includes a clock input 90 to receive bursts of clock pulses from the oscillator 41 via the logic circuitry 80 and an up/down control input 91 that determines whether the counter 81 is to count up or down from the off-set number count level. Such up/down control depends on the relative polarity of the reference electrical signal when the bursts of clock pulses are delivered to the clock input 90.

There is also illustrated coupled to the counter output 87 utilization circuitry 92. The utilization circuitry may comprise latching and display circuits for displaying the binary number system output signal from the counter 81 in true binary or digital format, a control type circuit to provide a control function in response to such system output signal and, thus, the position of the core 12 in the LVPT 1, etc. The utilization circuitry 92 preferably is of the controlled type such that it only receives the system output signal from the counter output 87 when also receiving a logic 1 data valid signal at a control inut 93 from the logic circuitry 80.

The logic circuitry 80 includes an AND gate 100 which has two inputs respectively coupled to the reference line 56 and line 77 to receive the reference electrical signal and the phase modulated square wave signal. The output of the AND gate 100 is coupled to the load input 86 of the counter 81. When both input signals to the AND gate 100 are logic 1, a logic 1 output is produced, the leading edge of which causes the counter 81 to preload the off-set number from the preload input circuits 82.

The logic circuitry 80 also includes an Exclusive OR gate 101, which has its inputs also coupled to the reference line 56 and line 77 to receive the reference electrical signal and the phase modulated square wave signal. The Exclusive OR gate 101 will produce a logic 1 signal on the line 102 when the reference electrical signal and the phase modulated square wave signal are of opposite polarities. Such logic 1 signal will be referred to hereinafter as a phase gate signal that effectively enables an AND gate 103, referred to below as a phase gate, to pass a burst of clock pulses from the oscillator 41 to the clock input 90 of the counter 81, whereupon the counter is incremented or decremented an amount determined by the phase count, i.e. the number of clock pulses in the burst passed by the phase gate 103. The resulting count level achieved by the counter 81 in a binary format is applied at the counter output 87 on lines 88 as the system output signal directly indicative of the phase of the phase modulated output signal, and, thus, of the position of the core 12 in the LVPT 1.

A NOR gate 104 produces a logic 1 signal at the control input 93 of the utilization circuitry 92 whenever both the reference electrical signal and the phase modulated square wave signal are at relatively zero or negative potentials, which will occur only after two conditions are both satisfied, namely, first, a predetermined binary number from the preload input circuits has been preloaded into the counter 81 and, second, a valid counting of a phase count has occurred. If the reference and outut signals are out of phase the number of counts or pulses in each burst will be a non-zero number, but if those signals are in phase the Exclusive OR gate 101 will not be satisfied, the number of counts in the phase count burst will be zero, i.e. the phase count is zero, and data valid signal will be produced promptly at the conclusion of the logic 1 load signal from AND gate 100. Then immediately following the valid counting of a non-zero phase count by the counter, e.g. immediately following the conclusion of a proper phase gate signal as will be described further below, such logic 1 data valid signal is produced by the NOR gate 104. Such data valid signal energizes or opens the utilization circuitry 92 to receive the system output binary signal on the output lines 88 of the counter 81.

Operation of the LVPT 1 and the electric circuit 2 of FIG. 3 will now be described assuming that the core 12 is in null position evenly centered between the two primary coils 5, 6. The phase of the phase modulated output signal on the output lines 70, 71 from the secondary coil 7 and, particularly, the phase of the phase modulated square wave signal on the line 77 will be exactly the same as the phase of the reference electrical signal on the reference line 56. The value of the off-set number set by the switches 83 in the preload input circuits 82 may be set to a digital value of 250, for example, which, as will be clear from the following description, will be the digital value of the system output signal on the output lines 88 when the core 12 is in null position. The binary number 0011111010 represents the digital value of 250; for each zero or one in the binary number a respective switch 83 is closed or opened, respectively.

When both the reference electrical and phase modulated square wave signals are positive, the AND gate 100 is satisfied and the off-set number is preloaded from the switches 83 into the counter 81. However, the Exclusive OR gate 101 will never be satisfied because the reference electrical signal and the phase modulated square wave signal are exactly in phase; therefore, a phase gate signal will not be produced, and the counter 81 will never be incremented or decremented from the preloaded off-set number count level. When both the reference electrical signal and the phase modulated square wave signal are at logic zero levels, the NOR gate 104 is satisfied to provide a data valid signal which opens the utilization circuitry 92 to receive the system output signal on the output lines 88. Since the counter 81 has not been incremented or decremented, the system output signal will be the same binary number as that originally preloaded into the counter 81; thus, the off-set number value produced as the system output signal indicates a null position of the core, and by re-setting the switches this value may be changed. This operation will repeat cyclically as long as the core 12 remains in the null position in the VLPT 1. Moreover, similar operation would occur with the core 12' of the LVPT 1' also being located in its respective null position relative to the two primaries 5', 6' of FIG. 2.

Figure 2:
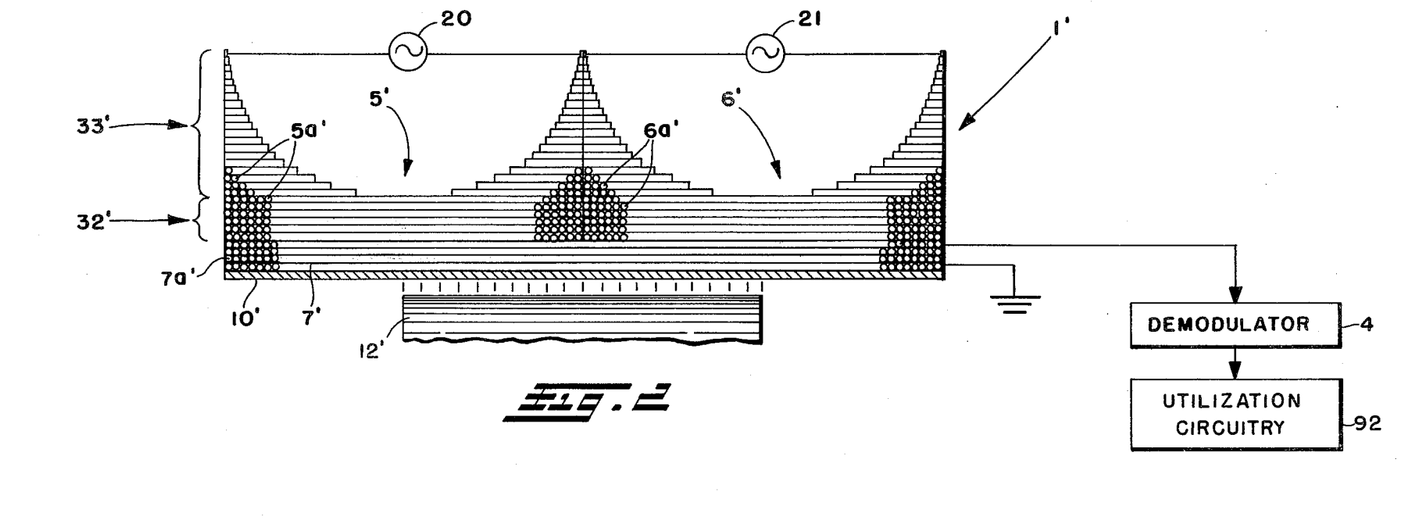
FIG. 2 is a partial section view schematically illustrating another form of LVPT in accordance with the invention.
Figure 2B:
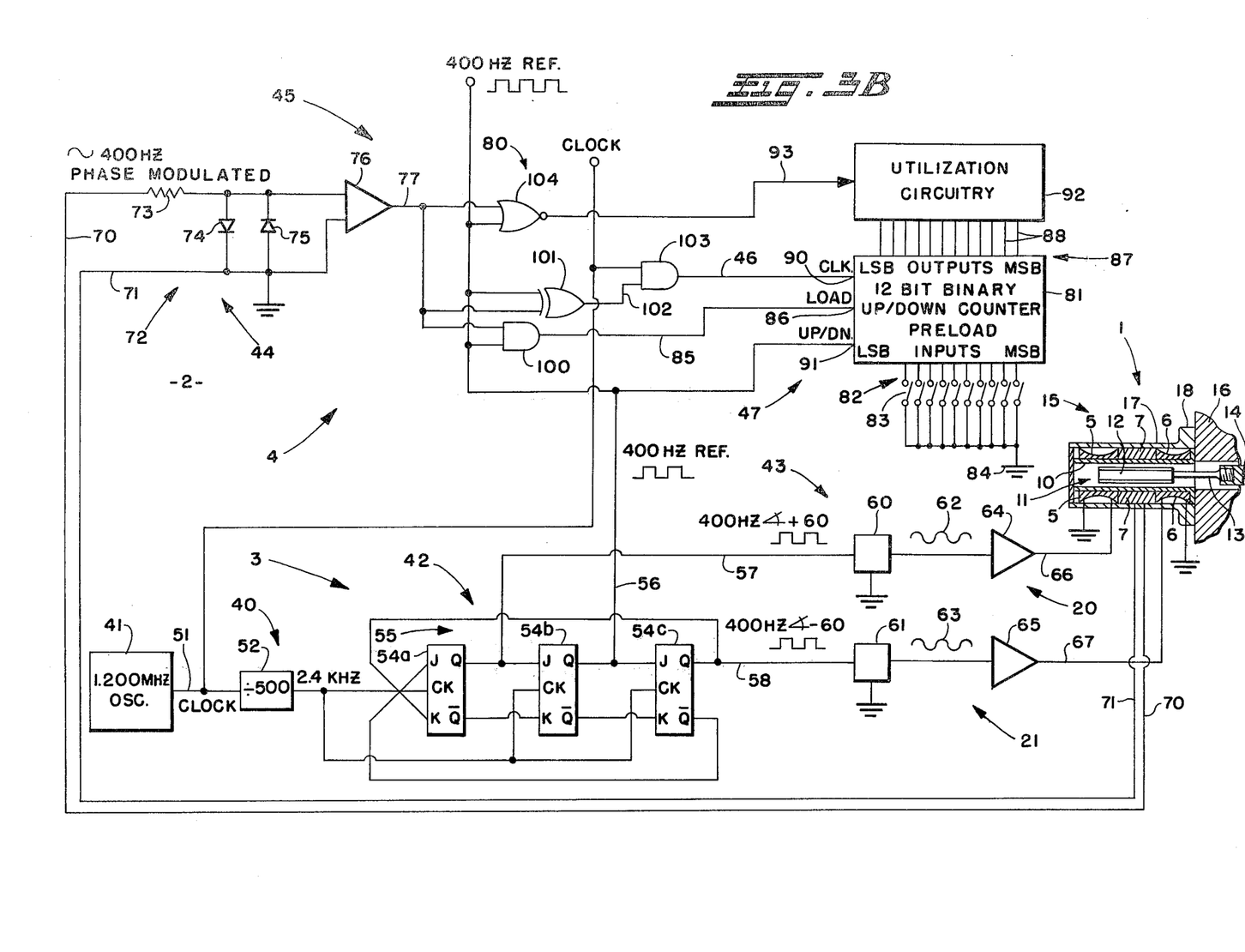

Another operational example of the LVPT 1 and the electric circuit 2 will now be presented assuming the core 12 is displaced to the left relative to the null positions illustrated in FIGS. 2 and 3 by an amount, say, for example, three-tenths of an inch such that the phase of the output signal and, thus, of the phase modulated square wave signal will lead the reference signal by 18°, and also assuming the foregoing criteria. The reference electrical signal is illustrated at 110 in FIG. 5A having relatively positive (logic 1) and negative (logic 0) going portions. The phase modulated square wave signal, which would appear on line 77 of the electric circuit 2, is illustrated at 111 in the graph of FIG. 5B, such signal also having relatively positive (logic 1) and negative (logic 0) portions. The phase difference between the reference electrical signal and the phase modulated square wave signal is indicated generally at 112, whereby the phase modulated square wave signal relatively leads the reference electrical signal by 18°.

In the graph of FIG. 5C the preload signal from the AND gate 100 is indicated at 113 having relatively positive (logic 1) and negative (logic 0) portions, the logic 1 portions, of course, appearing whenever both the reference electrical signal and the phase modulated square wave signal are relatively positive. Thus, whenever the preload signal 113 is logic 1 the off-set number from the preload input circuits 82 will be preloaded into the counter 81. At time $t_1$, the phase modulated square wave signal 111 drops to logic 0 while the reference electrical signal 110 remains logic 1; therefore the Exclusive OR gate 101 is satisfied to produce a logic 1 phase gate signal 114 in FIG. 5E. The phase gate signal 114 will terminate at time $t_2$ when the reference electrical signal 110 drops to logic 0, whereupon the Exclusive OR gate 101 no longer is satisfied. However, during the times $t_1$ and $t_2$ while the phase gate signal 114 is being produced, the phase count, i.e. a burst of the clock pulse signals from the oscillator 41, generally depicted at 115 in FIG. 5F is delivered to the clock input 90 of the counter 81.

Figures 5A, 5G:
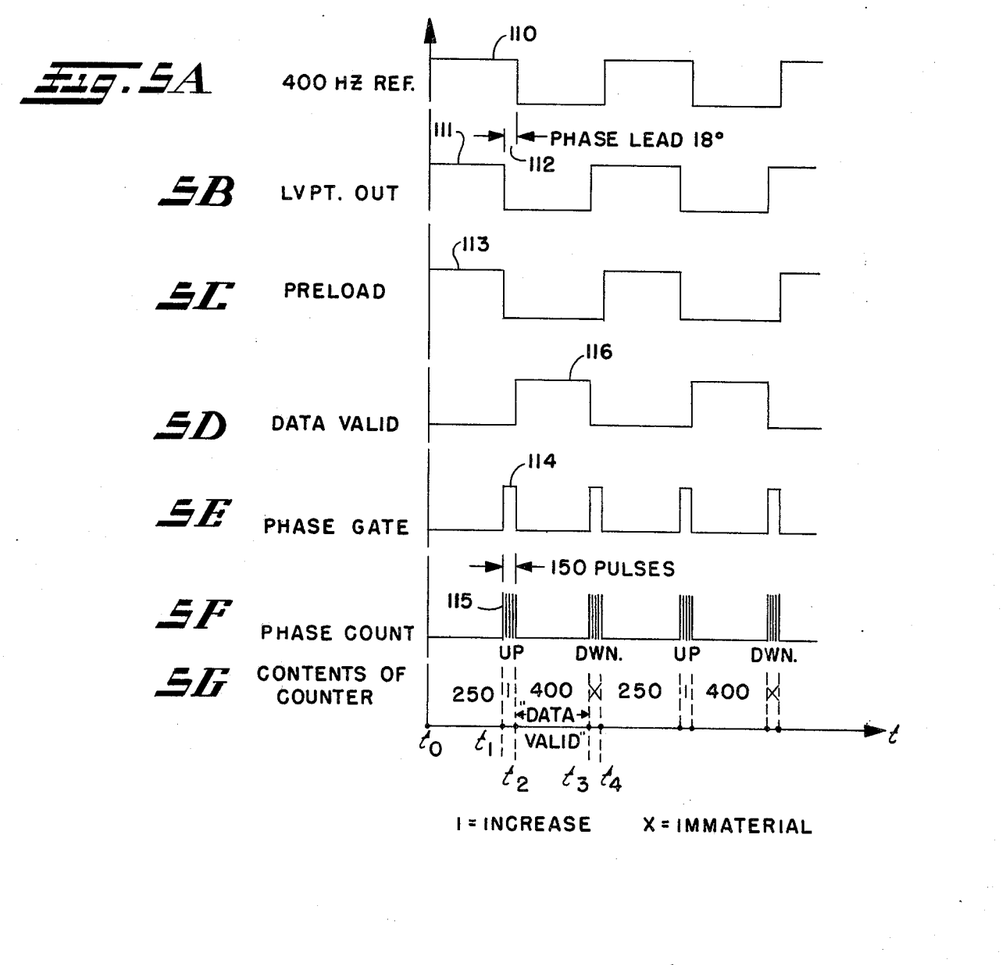

Inasmuch as the phase separation between the phase modulated square wave signal 111 and the reference electrical signal 110 is 18°, the number of pulses per burst of the phase count is equal to 18° divided by 360° times 3000 counts or clock pulses, which is the number of clock pulses in one 400 Hz period, that equals 150 pulses per burst. Moreover, since the reference electrical signal 110 is positive while the phase gate signal 114 is produced, the counter 81 will be incremented by the phase count value of 150, i.e. the counter will count up from the preloaded off-set count level of, say 250, to a value of 400. This 400 value will be provided on the output lines 87 in a binary format. The actual contents or count level of the counter 81 whenever the counter is not counting is illustrated in the blocks in FIG. 5G. Thus, the counter 81 is at the preloaded count level of 250 between times $t_0$ and $t_1$, and after having counted the phase count of 150 pulses, the counter will be at a value of 400 between times $t_2$ and $t_3$. Moreover, at the time $t_2$ when the reference electrical signal 110 goes to logic 0 terminating the phase count, the NOR gate 104 is satisfied so that a data valid signal 116 shown in the graph of FIG. 5D is produced so that the system output signal on the output lines 88 from the counter 81 is loaded into or otherwise delivered to the utilization circuitry 92.

At time $t_3$ of FIGS. 5A-5G the phase modulated square wave signal 111 on the line 77 again becomes logic 1 while the reference electrical signal remains relatively negative, thereby satisfying the Exclusive OR gate 101, which then allows another burst of clock pulses to pass to the clock input 90 of the counter 81. In this case, the counter 81 would then count in a downward direction from the 400 count level previously achieved because the reference electrical signal is then at a relatively negative level. However, such downward count is immaterial because there will be no data valid signal occurring thereafter; rather, at time $t_4$ the reference electrical signal goes positive again so that the AND gate 100 is satisfied causing the off-set number in the preload input circuits 82 to be preloaded into the counter 81 again. Such operation will occur continuously as the core 12 remains at the indicated position three-tenths of an inch to the left of its null position.

Moreover, similar operation of the LVPT 1 and the electric circuit 2 will occur when the core 12 moves to the right of the null position such that the phase of the phase modulated output signal on the output lines 70, 71 and the phase modulated square wave signal on the line 77 will lag the reference electrical signal. In this case, the off-set number will be preloaded into the counter 81 when both the reference electrical signal and the phase modulated square wave signal are relatively positive, but the positive phase gate signal will be produced when the reference electrical signal goes negative while the phase modulated square wave signal remains positive. Also, since the reference electrical signal will be negative when the phase gate signal is produced and the phase count is passed to the counter 81, the latter will be decremented by the phase count. At the conclusion of the phase gate signal when the phase modulated square wave signal goes negative, the data valid signal will be produced so that the utilization circuitry 92 receives the system output signal as the decremented count level achieved by the counter 81. Similar cyclical operation of the LVPT 1 and electric circuit 2 will occur as long as the phase modulated output signal lags the reference electrical signal.

It will now be appreciated that LVPT 1 of the invention produces a phase modulated output signal that is directly indicative of the position of the core 12. In the preferred embodiment the core 12 is movable relative to the primaries and secondary of the LVPT 1; however, it will be appreciated that the core itself may be maintained fixedly positioned and the coils of the LVPT 1 move with respect to the core itself. Moreover, the electric circuit 2 includes a drive circuit portion 3, which energizes the LVPT 1 with respective excitation signals that are out of phase by an amount other than zero degrees or 180° and which also produces a reference electrical signal, and a demodulator circuit portion 4, which analyzes the phase of the phase modulated output signal with respect to the phase of the reference electrical signal. The ultimate system output signal of the system is provided in a digital format, preferably as a binary number representation, and may be directly interfaced with a computer, with other control circuitry, with display means, etc. It will also be clear that the measured parameter of the phase modulated output signal produces by the secondary of the LVPT 1 is the phase thereof as a time-based signal without criticality being attached to the amplitude of such output signal as long as the amplitude thereof is satisfactory for detection purposes.

The embodiments of the invention in which an exclusive property or privilege is claimed are defined as follows:

1. A displacement to phase transducor, comprising a plurality of primary means for producing in response to alternating current excitation at different respective phases alternating magnetic fluxes separated by other than zero or one hundred eighty degrees, combining means for combining such plural fluxes to produce an output flux having a phase dependent on those of such plural fluxes and the relative positions of said combining means and said primary means, said primary means and combining means being relatively movable, and output means for producing an output AC electrical signal having a phase corresponding to the phase of such output flux, said primary means comprising two primary electromagnetic coils each including winding means having a non linear distribution of turns which cause the phase of such output flux to vary substantially linearly with respect to relative linear displacement of said combining means and said primary coils.

2. The transducer of claim 1, wherein said combining means comprises a magnetically permeable core.

3. The transducer of claim 2, wherein said core is movable with respect to said primary means, and further comprising means for coupling said core to a movable external device, whereby the phase of such output flux and the phase of such output AC electrical signal are indicative of the position of such external device.

4. The transducer of claim 1, wherein said primary means consists of a pair of primary electromagnetic coils, and said output means comprises a secondary electromagnetic coil.

5. The transducer of claim 4, wherein said winding means of said coils are wound circumferentially, and said combining means comprises a magnetically permeable core linearly movable within a volume generally circumscribed by said coils.

6. The transducer of claim 5, wherein said core and said secondary electromagnetic coil are related such that the number of turns of the latter cut by said core remains the same during operation of the transducer.

7. The transducer of claim 5, wherein said secondary electromagnetic coil is located axially between said primary electromagnetic coils.

8. The transducer of claim 5, wherein said secondary electromagnetic coil is located between said primary electromagnetic coils and said volume.

9. The transducer of claim 5, further comprising means for physically isolating said magnetically permeable core from said coils.

10. The transducer of claim 9, wherein said means for physically isolating forms a fluid pressure barrier between said core and said coils.

11. The transducer of claim 4, wherein said secondary electromagnetic coil has a number of turns that is approximately equal to the number of turns in each of said primary electromagnetic coils.

12. The transducer of claim 1, further comprising means for supplying respective AC excitation signals at approximately equal magnitude and wave form but of different phase to each of said primary electromagnetic coils.

13. The transducer of claim 12, wherein said means for supplying supplies such excitation signals at a phase separation of approximately 120°.

14. The transducer of claim 12, further comprising detector means for detecting the phase difference between the phase of such output AC electrical signal and the phase of a reference AC electrical signal, whereby the magnitude of such phase difference is indicative of the relative positions of said combining means and said primary means.

15. The transducer of claim 14, further comprising means for converting such phase difference to digital information.

16. The transducer of claim 1, further comprising means for generating a plurality of AC excitation signals having different respective phases separated by other than zero or one hundred eighty degrees, and means for coupling respective excitation signals to said respective primary means.

17. The transducer of claim 16, wherein said means for generating comprises constant current amplifier means for generating such excitation signals with respective equivalent substantially constant amplitudes.

18. The transducer of claim 16, wherein said means for generating also generates an AC reference signal having a phase that is different from the respective phases of such excitation signals.

19. The transducer of claim 18, wherein said means for generating comprises flip-flop means for producing such excitation signals at a phase separation of approximately 120° and a reference signal at a phase separation of approximately 60° from each of the phases of such excitation signals, a clock signal generator means for producing clock pulse signals, means for coupling said clock signal generator means to said flip-flop means for driving the latter, and phase gate means coupled to said clock signal generator means for supplying an output burst of clock pulse signals indicative of the phase separation of such output AC electrical signal and such reference signal.

20. The transducer of claim 18, further comprising clock signal generating means for producing clock pulse signals, counter means for counting input signals thereto, and delivery means for delivering to said counter means as input signals thereto a number of such clock pulse signals dependent on the difference between the phase of such output AC electrical signal and the phase of such reference signal, said delivery means comprising logic circuit means for passing a burst of clock pulse signals to said counter means when the polarity of such output AC electrical signal and the polarity of such reference signal are different, and said logic circuit means including AND gate means for passing clock pulse signals when enabled and Exclusive OR gate means for enabling said AND gate means when the polarity of such output AC electrical signal and the polarity of such reference signal are different.

21. The transducer of claim 1, wherein said output means comprises means for generating a digital output indicative of the relative positions of said primary means and said combining means.

22. The transducer of claim 1, wherein said combining means comprises a magnetically permeable core, and said output means comprises a secondary electromagnetic coil, and further comprising means for supplying said primary electromagnetic coils with respective AC excitation signals at constant currents and substantially the same wave forms, whereby the frequency of such output AC electrical signal is the same as that of such excitation signals.

23. The transducer of claim 22, further comprising means for producing an AC reference signal, and means for detecting the phase difference between the phase of such output AC electrical signal and such reference signal, whereby such phase difference is indicative of the relative positions of said primary electromagnetic coils and said core.

24. The transducer of claim 23, wherein said core is linearly movable in a volume substantially circumscribed by said winding means of said coils and said core and said secondary electromagnetic coil are related such that during operation of the transducer said core always cuts substantially the same number of turns of said secondary electromagnetic coil.

25. A displacement to phase transducer, comprising a plurality of primary means for producing in response to alternating current excitation at different respective phases alternating magnetic fluxes separated by other than zero or one hundred eighty degrees, combining means for combining such plural fluxes to produce an output flux having a phase dependent on those of such plural fluxes and the relative positions of said combining means and said primary means, said primary means and combining means being relatively moveable, and output means for producing an output AC electrical signal having a phase corresponding to the phase of such output flux, said primary means comprising at least one pair of primary electromagnetic coils, said output means comprising at least one secondary electromagnetic coil, said coils being generally circumferentially wound about a common axis, said at least one secondary coil being located axially between said at least one pair of primary coils, and each primary coil having a non linear distribution of turns which causes the phase of said output flux to vary substantially linearly with the relative movement of said primary means and combining means.

26. The transducer of claim 25, wherein said combining means comprises a magnetically permeable core movable with respect to said coils.

27. The transducer of claim 26, further comprising means for supplying respective AC excitation signals at approximately equal magnitude and wave form but of different phase to each of said primary coils.

28. A displacement to phase transducer, comprising a plurality of primary means for producing in response to alternating current excitation at different respective phases alternating magnetic fluxes separated by other than zero or one hundred eighty degrees, combining means for combining such plural fluxes to produce an output flux having a phase dependent on those of such plural fluxes and the relative positions of said combining means and said primary means, said primary means and combining means being relatively movable, and output means for producing an output AC electrical signal having a phase corresponding to the phase of such output flux, said primary means comprising respective primary electromagnetic coils, each being wound such that the phase of such output flux varies approximately linearly with respect to relative linear displacement of said combining means and said primary coils; means for generating a plurality of AC excitation signals having different respective phases separated by other than zero or one hundred eighty degrees, said means for generating also generating an AC reference signal having a phase that is different from the respective phases of such excitation signals, and means for coupling respective excitation signals to said respective primary means; and clock signal generating means for producing clock pulse signals, counter means for counting input signals thereto, and delivery means for delivering to said counter means as input signals thereto a number of such clock pulse signals dependent on the difference between the phase of such output AC electrical signal and the phase of such reference signal, said delivery means comprising logic circuit means for passing a burst of clock pulse signals to said counter means when the polarity of such output AC electrical signal and the polarity of such reference signal are different, means for setting said counter means to a predetermined count level prior to delivery of such burst of clock pulse signals thereto, and validating means responsive to such setting of said counter means and the completion of delivery of a burst of clock pulses to said counter means for producing a data valid signal indicative of the presence of a valid count level signal output from said counter means.

29. A displacement to phase transducer, comprising a plurality of primary means for producing in response to alternating current excitation at different respective phases alternating magnetic fluxes separated by other than zero or one hundred eighty degrees, combining means for combining such plural fluxes to produce an output flux having a phase dependent on those of such plural fluxes and the relative positions of said combining means and said primary means, said primary means and combining means being relatively movable, and output means for producing an output AC electrical signal having a phase corresponding to the phase such output flux, said primary means comprising respective primary electromagnetic coils, each being wound such that the phase of such output flux varies approximately linearly with respect to relative linear displacement of said combining means and said primary coils; means for generating a plurality of AC excitation signals having different respective phases separated by other than zero or one hundred eighty degrees, said means for generating also generating an AC reference signal having a phase that is different from the respective phases of such excitation signals, and means for coupling respective excitation signals to said respective primary means; and clock signal generating means for producing clock pulse signals, counter means for counting input signals thereto, and delivery means for delivering to said counter means as input signals thereto a number of such clock pulse signals dependent on the difference between the phase of such output AC electrical signal and the phase of such reference signal, said delivery means comprising logic circuit means for passing a burst of clock pulse signals to said counter means when the polarity of such output AC electrical signal and the polarity of such reference signal are different, and validating means responsive to the completion of delivery of a burst of clock pulses to said counter means for producing a data valid signal indicative of the presence of a valid count level signal output from said counter means.

30. The transducer of claim 29, wherein said validating means comprises a NOR gate that produces such data valid signal when the polarity of such output AC electrical signal and the polarity of such reference signal are both at relatively logic zero levels.

31. A displacement to phase transducer, comprising a plurality of primary means for producing in response to alternating current excitation at different respective phases alternating magnetic fluxes separated by other than zero or one hundred eighty degrees, combining means for combining such plural fluxes to produce an output flux having a phase dependent on those of such plural fluxes and the relative positions of said combining means and said primary means, said primary means and combining means being relatively movable, and output means for producing an output AC electrical signal having a phase corresponding to the phase of such output flux, said primary means comprising respective primary electromagnetic coils, each including winding means for cooperating to cause the phase of such output flux to vary substantially linearly with respect to relative linear displacement of said combining means and said primary coils, said winding means of said primary coils including plural windings circumferentially wound about a common axis with the axial distribution of windings of each primary coil being non-linear, and said combining means comprising a magnetically permeable core within a volume generally circumscribed by said primary coils and relatively linearly movable with respect to said primary coils.

32. The transducer of claim 31, wherein such non-linear axial distribution of windings is proportional to an approximately linear solution of an Arc Tangent function.

33. The transducer of claim 32, wherein said primary means comprises two primary coils, and such Arc Tangent function is $$\phi_c = \text{Arc Tangent} \frac{N_1 - N_2}{N_1 + N_2} \text{Tangent} \frac{\theta}{2}$$

where $\phi_c$ is the phase of flux in said core, $N_1$ and $N_2$, respectively, are the number of winding turns of the respective primary coils aligned with said core for a given relative position of said core with respect to said primary coils, and $\theta$ is the phase separation of the respective AC excitations of said primary coils.

34. The transducer of claim 31, wherein each of said primary coils is substantially symmetrical and includes at least one complete layer of winding turns distributed along its axial length and at least one partial layer of winding turns.

35. The transducer of claim 34, wherein said at least one layer of partial winding turns comprises two spaced apart portions leaving an open area therebetween at a location approximately centered along the axial length of the primary coil.

36. The transducer of claim 35, wherein each primary coil comprises a plurality of full layers of winding turns and a plurality of partial layers of winding turns with the total of turns and, thus, the total axial length occupied by at least two of said partial layers being different.

37. The transducer of claim 36, wherein said primary means comprises two primary coils, and wherein such non-linear axial distribution of windings is proportional to an approximately linear solution of the Arc Tangent function $$\phi_c = \text{Arc Tangent} \frac{N_1 - N_2}{N_1 + N_2} \text{Tangent} \frac{\theta}{2}$$

where $\phi_c$ is the phase of flux in said core, $N_1$ and $N_2$, respectively, are the number of winding turns of the respective primary coils aligned with said core for a given relative position of said core with respect to said primary coils, and $\theta$ is the phase separation of the respective AC excitations of said primary coils.

* * * * *